No. 801,822. PATENTED OCT. 10, 1905.
C. F. BEAKBANE & W. E. HIPKINS.
AUTOMATIC WEIGHING MACHINE.
APPLICATION FILED JUNE 12, 1905.

2 SHEETS—SHEET 1.

WITNESSES:
C. H. Walker
Lillie M. Perry.

INVENTORS
Charles F. Beakbane
William E. Hipkins
By Finckel & Finckel
Attorneys

No. 801,822.

PATENTED OCT. 10, 1905.

C. F. BEAKBANE & W. E. HIPKINS.
AUTOMATIC WEIGHING MACHINE.
APPLICATION FILED JUNE 12, 1905.

2 SHEETS—SHEET 2.

WITNESSES:
C. N. Walker,
Lillie M. Perry.

INVENTORS
Charles F. Beakbane
William E. Hipkins
BY Fmckel & Fmckel
Attorneys

UNITED STATES PATENT OFFICE.

CHARLES F. BEAKBANE AND WILLIAM E. HIPKINS, OF BIRMINGHAM, ENGLAND.

AUTOMATIC WEIGHING-MACHINE.

No. 801,822. Specification of Letters Patent. Patented Oct. 10, 1905.

Original application filed June 16, 1904, Serial No. 212,859. Divided and this application filed June 12, 1905. Serial No. 264,936.

*To all whom it may concern:*

Be it known that we, CHARLES F. BEAKBANE, engineer, residing at Elmdon Road, Acocks Green, Birmingham, and WILLIAM E. HIPKINS, of the firm of W. T. Avery, Limited, Soho Foundry, residing at Birmingham, in the county of Warwick, England, subjects of King Edward of Great Britain and Ireland, have invented certain new and useful Improvements in Automatic Weighing-Machines for Grain and the Like, of which the following is a specification.

To insure accurate weighments in automatic weighing-machines, it is imperative that the amount of grain or other flowing material held in suspension during the dribble period should be constant and equal, so that the amount of material in suspension when the final cut-off is accomplished shall in each weighment be exactly alike.

To obviate the liability of insufficiency of a constant and equal supply during the dribble period is the object of our invention.

Our improvement consists of an arrangement of a valve mechanism adapted for use in connection with weighing-machines in which a supplementary hopper is employed to deliver the dribble or diminished supply to the weigh-hopper, and particularly for use in connection with the arrangement of hoppers and discharge-spouts referred to in our pending application for improvements in automatic weighing-machines, Serial No. 212,859, filed June 16, 1904, and of which the present is a divisional application.

Our invention will be more clearly understood by reference to the accompanying drawings, in which—

Figure 1:
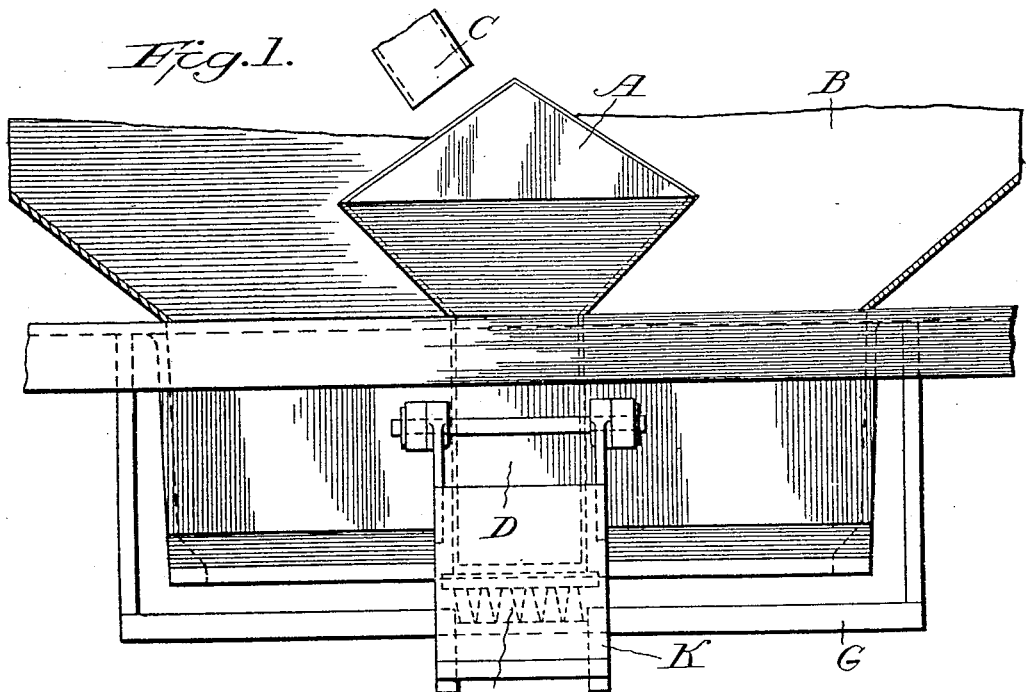
Figure 2:
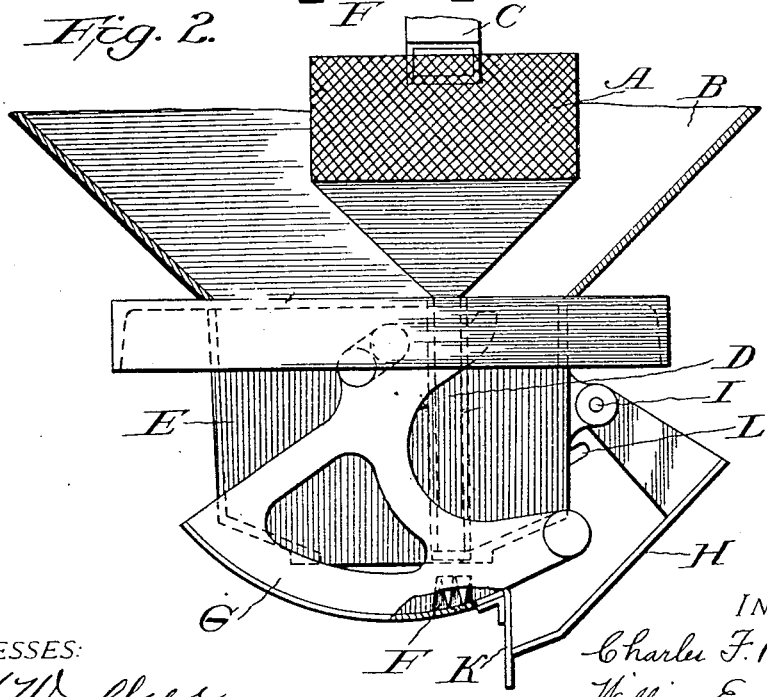
Figure 1:
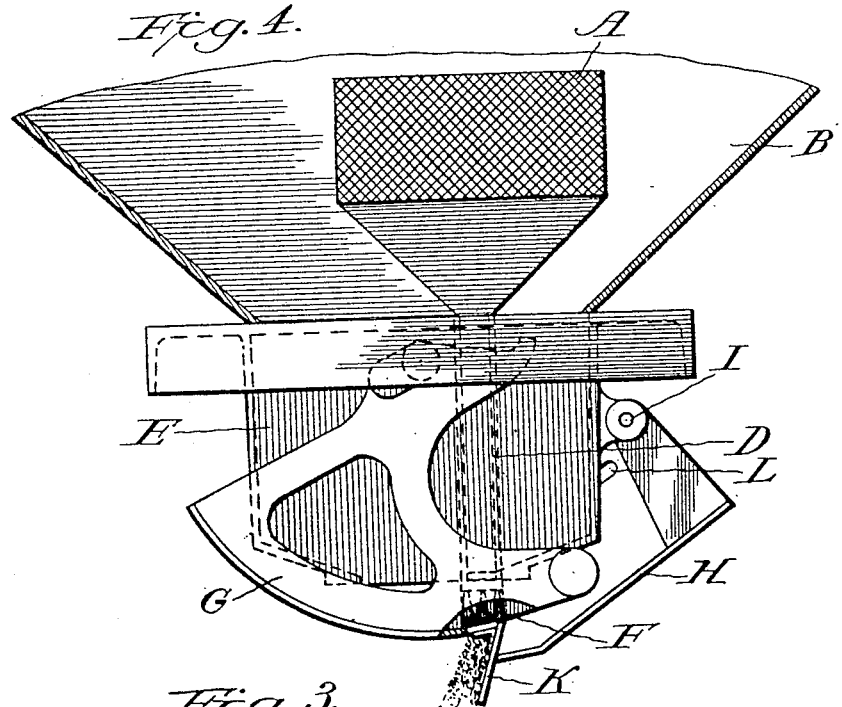
Figure 3:
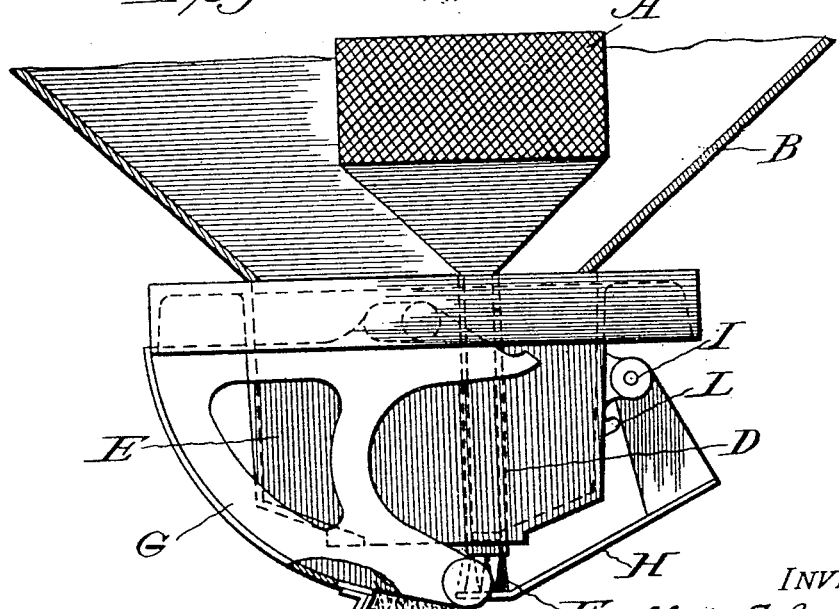

Figure 1 is a front elevation of an embodiment of our invention; Fig. 2, a side elevation of the same, showing the machine at rest; Fig. 3, a side elevation showing the machine when the full supply is being delivered through the main discharge-spout; and Fig. 4 a side elevation showing the machine when the dribble or diminished supply is being delivered, the same letters of reference being used to indicate similar parts throughout the various figures.

In the construction and arrangement of hoppers to which our improved valve mechanism is particularly adapted the supplementary hopper A is placed inside the main hopper B and so located with reference thereto and to the means of supply C that the flow of material is first directed to the supplementary hopper and the overflow therefrom into the main hopper. The lower portion of the supplementary hopper is reduced in area to form a hollow shaft or spout D, which is carried within the spout E of the main hopper and continues down to the cut-off gate, where it is supplied with brushes F for sealing the joint with the main gate of the valve mechanism.

The valve mechanism comprises a two-part structure adapted to move across the discharge ends of the spouts D and E to control the discharge therefrom, the said parts coöperating to jointly close both of said spouts and to open each separately in the complete operation of feeding the main and dribble supply of material at each weighment.

G designates the main gate, suitably pivoted to the frame of the machine, and H a supplementary gate pivoted at I upon the spout E.

K is a flange or projection-piece upon the main gate G, adapted to engage the supplementary gate to move the same away from the discharge end of the dribble-spout in the closing movement of the main gate, the said supplementary gate adapted to swing by gravity across the discharge end of the dribble-spout as the main gate is moved to open position.

L is a stop to limit the closing movement of the dribble-gate.

The operation of the machine is as follows: When the material is delivered to the large hopper B, the smaller hopper A becomes first filled and overflows. The machine commences to work under the weight of the material in the main hopper, as is usual, and the main gate moves upward, and so allows the material to fall through the aperture in the spout E to the weigh-hopper below. (Not shown.) The opening of the main gate G allows the smaller gate H to fall until it cuts off the supply from the spout D of the supplementary hopper, the gate H being held from further forward movement by the stop L. When nearly the required amount of material has passed through the spout E, the main gate G descends by the action of the machine in the usual manner, and in its descent the projection-piece K, fixed on the main gate G, strikes the smaller gate H, and thereby pushes it up, and so unseals the spout D of the supplementary hopper, thus insuring a sufficient and even flow of material to complete the weighment. During this operation the gate H rests against the projection-piéce K in such a manner that the material can only be supplied through the spout D, which material then passes through an aperture in the main gate G of the same area as the spout D. When the required amount has been obtained, the main gate G completes its descent by the action of the machine, carrying with it the smaller gate H, until they assume the position shown in Fig. 2, thereby cutting off the dribble-supply from the spout D.

What we claim is—

1. In a feeding device for automatic weighing-machines for grain and the like, a main supply-hopper, a dribble supply-hopper, independent discharge-spouts for said hoppers, and a valve comprising a main gate adapted to move across the discharge ends of both of said spouts and a supplementary gate adapted to move across the discharge end of one of said spouts the two gates coöperating to control the discharge from said spouts.

2. In a feeding device for automatic weighing-machines for grain and the like, a main supply-hopper, a dribble supply-hopper, independent discharge-spouts for said hoppers, and a valve comprising a main gate adapted to move across the discharge ends of both of said spouts and a supplementary gate controlled by said main gate and adapted to move across the discharge end of one of said spouts, the two gates coöperating to control the discharge from said spouts.

3. In a feeding device for automatic weighing-machines for grain and the like, a main supply-hopper, a dribble supply-hopper, independent discharge-spouts for said hoppers, and a valve comprising a main gate adapted to move across the discharge ends of both of said spouts and having an aperture adapted to register with the dribble-spout and a supplementary gate adapted to move across the discharge end of the dribble-spout, the said gates coöperating to control the discharge from said spouts.

4. In a feeding device for automatic weighing-machines for grain and the like, a main supply-hopper, a dribble supply-hopper, independent discharge-spouts for said hoppers, a valve comprising a main gate adapted to move across the discharge ends of both of said spouts and a supplementary gate adapted to move across the discharge end of the dribble-spout, the said supplementary gate being independently pivoted and adapted to swing in one direction by gravity, and means on the main gate for engaging the supplementary gate to move the same in the other direction.

5. In a feeding device for automatic weighing-machines for grain and the like, a main supply-hopper, a dribble supply-hopper, independent discharge-spouts for said hoppers, a valve comprising a main gate adapted to move across the discharge ends of both of said spouts and a supplementary gate adapted to move across the discharge end of the dribble-spout, the said supplementary gate being independently pivoted and adapted to swing in one direction by gravity, a stop for limiting the said gravitating movement, and means on the main gate adapted to engage the supplementary gate to move the same in the other direction.

CHARLES F. BEAKBANE.
WILLIAM E. HIPKINS.

Witnesses:
ERNEST HARKEN,
MARSHAL HALSTEAD.